Patented July 30, 1940

2,209,908

UNITED STATES PATENT OFFICE 2,209,908

CONTACT MASS FOR USE IN THE CATALYTIC VAPOR PHASE OXIDATION OF ORGANIC COMPOUNDS

John M. Weiss, New York, N. Y., assignor, by mesne assignments, to Calorider Corporation, a corporation of Connecticut No Drawing. Application July 14, 1938, Serial No. 219,187

7 Claims. (Cl. 23—234)

This invention relates to the partial oxidation of organic materials by oxidizing them with an oxygen containing gas in the vapor phase and in the presence of a solid contact mass. More particularly it relates to improved contact masses therefor and the processes in which these improved contact masses are used. These contact masses have shown especially desirable results in the production of acid anhydrides from suitable organic materials, especially from aromatic hydrocarbons, and particularly in oxidations where ring fissure occurs in the desired partial oxidation.

One embodiment of this invention which will be described in detail relates to the production of maleic acid and maleic anhydride by partially oxidizing a suitable organic material in the presence of my new and improved solid contact mass. Another embodiment which will be exemplified in detail relates to the production of phthalic anhydride by the vapor phase oxidation of naphthalene in the presence of my new and improved solid contact mass. It will, however, be fully understood that I do not intend to limit the scope of my invention to the production of maleic anhydride, maleic acid and phthalic anhydride. It will be fully understood that my new contact mass may be employed in a large diversity of organic vapor phase catalytic oxidations, such as, for example, the production of anthraquinone from anthracene; benzaldehyde and benzoic acid from toluene; quinones and acids from phenanthrene; fluorene and other multiple ring hydrocarbons; aldehydes from xylenes and other alkyl substituted benzenes; formaldehyde from methanol, and that such oxidations involving the use of my new and improved contact mass are within the scope of my invention.

Maleic acid and maleic anhydride can be produced by the partial oxidation of various organic materials, such as, for example, benzene, phenol, crotonaldehyde, crotonic acid, furan, furfuryl alcohol, furfural oxymethylfurfural, pyromucic acid, turpentine oil, cyclopentadiene, butylene, etc. with an oxygen-containing gas in the presence of a suitable catalyst. To produce maleic acid or maleic anhydride, a mixture of such a suitable organic compound in the vapor phase and an oxygen-containing gas, for example, air, is passed over a heated contact mass containing a metallic oxide partial oxidation catalyst, such as, for example, vanadium oxide, supported on a carrier. Benzene is ordinarily the compound used. The particular material utilized as a carrier or support in the contact mass has a direct effect upon the activity and life of the catalyst, and, hence, upon the efficiency of the reaction. A number of different materials including, pumice, kieselguhr, asbestos, metallic aluminum, "Coralite" brick, "Filtros" and "Refractory Alundum," have been disclosed for use as catalyst supports or carriers in contact masses for this reaction.

Of the various catalyst supports or carrier which have been disclosed, "Refractory Alundum" has proved to be the most useful and has been extensively used in the commercial production of maleic acid, maleic anhydride, phthalic anhydride, etc. "Refractory Alundum" is a fused aluminum oxide material commonly used for filter blocks, pipes, etc., and contains about 80% aluminum oxide, about 20% aluminum silicate and small amounts of other materials including chemically combined sodium. The aluminum oxide in "Alundum" is in the form of minute crytal grains and is bonded into a porous mass by the aluminum silicate in vitrified form.

Even "Refractory Alundum", however, leaves much to be desired as a catalyst support, particularly when used in contact masses for use at the higher temperatures at which benzene, for example, may be partially oxidized. When "Refractory Alundum" is used as a catalyst support for vanadium oxide in the catalytic oxidation of benzene at a relatively high temperature, for example, 600° C., the productivity of the catalyst rapidly decreases, resulting in a short useful life of the catalyst which is a disadvantage in commercial operation in that it necessitates too frequent interruption of the operation of a plant for the replacement of the catalyst.

Now, in accordance with this invention, I provide an improved contact mass for the catalytic production of maleic acid and maleic anhydride which maintains its high initial activity over a long period of time, even when operated at relatively high temperatures. The contact mass in accordance with this invention comprises a catalytic metal oxide for the partial oxidation of organic compounds supported on a refractory aluminum oxide material which is now manufactured and sold under the trade name of "Tabular Corundum," by the Aluminum Company of America.

"Tabular Corundum" is a crystalline aluminum refractory material having readily bonded surfaces and consisting essentially of interlocked corundum crystals in tabular form, having the contained impurities disseminated in minute globules throughout the crystalline alumina, and being substantially free from intercrystalline glass, so that the refractory particles possess the properties of corundum rather than those of the glass or matrix of impurities. Impurities are present in "Tabular Corundum" only in very small quantities. Thus, the sodium content may be as low as 0.001% by weight, calculated as sodium oxide.

"Tabular Corundum" is a commercial product manufactured by mixing aluminum oxide with one or more of several compounds, and heating the mixture to a temperature within the range of about 800° C. to about 1800° C., but not to the melting point of aluminum oxide. The compound or compounds included with the aluminum oxide induces a recrystallization of the aluminum oxide to the alpha-corundum form. This recrystallization brings about a knitting of the entire mass into a bonded material. The compounds added for the purpose of inducing recrystallization are, for example, sodium oxide and chromic oxide and are sublimed out of the aluminum oxide during the heating process, leaving the aluminum oxide in the form of alpha-corundum and in a state of high purity. Spectrographic analyses of "Tabular Corundum" have shown very minute quantities of calcium and very low percentages of sodium to be essentially the only impurities present. However, such analyses have shown in addition to the sodium and calcium a large number of elements whose spectral lines are extremely faint and indeed only recognizable by most careful technique and manipulation in photographing the spectrum. The elements where such faint spectral lines were detected were iron, silicon, titanium, zirconium, vanadium, copper, manganese, lead, tin, silver, barium, strontium, gallium, magnesium, chromium and potassium.

"Tabular Corundum" is a distinctly different material from "Refractory Alundum." The aluminum oxide in "Tabular Corundum" has not been fused while that of "Refractory Alundum" has been. "Tabular Corundum" is almost entirely aluminum oxide and has the properties of the alpha-corundum crystalline form of aluminum oxide, while "Refractory Alundum" contains a high percentage of aluminum silicate and partakes of the properties of the aluminum silicate.

The "Tabular Corundum" which I use in my improved contact mass is broken up into small particles or pellets which are within the range of about 4 to about 20 mesh in size and preferably within the range of about 6 to about 10 mesh. The "Tabular Corundum" may, if desired, be given a preliminary acid wash with, for example, 35% nitric acid although such is not ordinarily essential when using the average grades of the material.

The contact mass in accordance with this invention comprises a catalytic oxide supported on and impregnated in "Tabular Corundum". Suitable catalytic oxides for the partial oxidation of benzene to maleic acid and/or maleic anhydride are oxides of metals from the fifth and sixth groups of the periodic system, such as, for example, vanadium, molybdenum, uranium, etc., or other oxides, either alone or in admixture. Ordinarily, I prefer to use vanadium oxide. The amount of the catalytic metallic oxide supported on and impregnated in the "Tabular Corundum" will ordinarily be within the range of about 1.0% to about 20% by weight of the "Tabular Corundum" and usually within the range of about 5% to about 12%, by weight.

In addition to "Tabular Corundum" and a catalytic oxide such as, vanadium oxide, the contact mass in accordance with this invention will desirably include an additional substance which will enhance or promote the activity of the catalytic oxide. Such a promotor may be one of those heretofore disclosed by the art or it may, and preferably will be a small quantity of one of the materials described in detail and claimed in my copending application Serial No. 157,678, filed August 6, 1937.

The materials include a group of substances which, when associated in very small proportions with the catalytic oxide in a contact mass, increase the production of maleic acid but, when associated in somewhat larger amounts, decrease and inhibit the productivity of the contact mass and thus act as poisons. These substances are, of themselves, catalytically inactive or at least very feebly active in promoting the vapor phase oxidation of benzene to maleic acid. They are only effective within narrow limits and the amounts associated with the catalytic oxides, such as, vanadium oxide, must be very closely controlled. The effect is progressive with the addition of successive amounts. They are progressively beneficial to increase the yield and productivity of the contact mass as the amount is increased, and after a certain optimum is passed, further addition causes the beneficial effect and the yield to decrease and the poisoning effect on the contact mass becomes evident. Thus, they are analogous to certain medicines of which small doses are beneficial and large doses are poisonous.

Examples are compounds of elements such as, sodium, potassium, lithium, magnesium, calcium and beryllium. In general, the compounds which are used are the sulfates, carbonates, oxides or acetates of the beneficial elements. I have found that amounts of less than 2% by weight of the vanadium oxide are effective in the cases of sodium, potassium, lithium, and magnesium, and that greater amounts adversely effect the yield or inhibit the desired catalytic action. Under some conditions, calcium and beryllium are effective in amounts under 5% by weight of the vanadium oxide.

The modifier which I may utilize in my contact mass may be present in the "Tabular Corundum" or may be added to the catalytic oxide impregnated and coated on the "Tabular Corundum." I may utilize a "Tabular Corundum" containing an amount of modifier sufficient to give the desired beneficial action on the finished contact mass. Thus, for example, I may utilize a "Tabular Corundum" containing from about 0.1% to about 0.35% by weight of sodium, and preferably 0.2% by weight, as a support for vanadium oxide containing no added sodium compound or other promoting material. When such a contact mass is in use, the sodium compound in the support functions to promote the vanadium oxide, either by actual migration from the support to the vanadium oxide coating or otherwise.

Alternately, I may utilize a "Tabular Corundum" containing a smaller amount of a modifier than is necessary to give the desired promoting action and then add a modifier to the catalytic oxide impregnated and coated on the "Tabular Corundum" in amount necessary to give the desired promoting action. Ordinarily, I prefer to select a "Tabular Corundum" containing no impurities or a minimum amount of impurities and add the modifier to the catalytic oxide.

The method of producing maleic acid or maleic anhydride in accordance with this invention comprises passing a mixture of an oxygen-containing gas, such as, air, and a suitable vaporized organic compound, for example, benzene, over a contact mass comprising a catalytic oxide impregnated in and coated on "Tabular Corundum", at an elevated temperature. I may use a temperature within the range of about 400° C. to about 700° C., but prefer, for best results, to use a temperature within the range of about 450° C. to about 650° C., or even within the narrow range of about 580° C. to about 630° C. When oxidizing benzene I ordinarily employ ratios of air to benzene of between 20–35 parts by weight of air to 1 part by weight of benzene vapor, but I am not limiting my invention to any exact ratios. It is desirable in plant operation as a practical matter to use ratios high enough to be above the explosive limit and not too high to cut down the output of a given catalytic convertor.

I have obtained good results using contact times of about 0.06 to about 0.25 second and have found, in general, that the lower range of contact times is more desirable when using the higher catalyst temperatures. Other factors being equal, the lower contact times are advantageous in increasing the productivity of a given apparatus. Increased productivity of equipment per unit time can also be obtained within certain limitations by increasing the pressure on the gases passing through the catalyst convertor so as to increase the feed and at the same time maintain the contact time the same as at a lower rate of loading at a lower temperature.

The contact time to which I refer hereinbefore is calculated, in seconds, as follows:

$$\text{Contact time} = \frac{9828 Vvp}{P(Q+q)(t+273)}$$

in which $V$=total volume of the contact mass in cubic feet.
$v$=% voids in the mass.
$P$=absolute pressure of gases in the mass, expressed as pounds per square inch.
$p$=atmospheric pressure (14.7 pounds).
$t$=contact mass temperature in ° C.
$Q$=cubic feet of free air per minute (at 0° C. and atmospheric pressure).
$q$=cubic feet of benzene vapor per minute (calculated to same temperature and pressure as Q).

Having now disclosed a number of factors to be considered in the preparation of the contact masses in accordance with this invention and their use for the catalytic oxidation of organic compounds to produce maleic acid and maleic anhydride in accordance with my invention, I shall present several specific examples of my improved contact mass, methods for its preparation, and for its use in the production of maleic acid from benzene. These examples are illustrative of the invention but I do not intend that they shall, of themselves, limit the scope of the broad discovery disclosed herein.

EXAMPLE I

*Preparation of a catalyst*

One hundred parts by weight of pure hydrated vanadium pentoxide ($V_2O_5 \cdot H_2O$), 1.4 parts by weight of anhydrous sodium sulfate and 500–550 parts by weight of pure hydrochloric acid, sp. gr. 1.18–1.19, were placed into a suitable fused silica container and heated to a temperature of 60–110° C. for a period of one hour with gentle agitation. This treatment resulted in the solution of the vanadium oxide and partial reduction to vanadyl chloride with a change of original orange-red color of the solution to a dark blue-green. An additional 200–250 parts by weight of the hydrochloric acid were then added slowly down the sides of the container and evaporation continued at the previous temperature. After approximately ½ hour, the reduction of the vanadium compounds appeared to be complete as evidenced by no further darkening of the blue-green color of the solution. If, at this stage of the process, the solution becomes sufficiently concentrated to cause the separation of crystals of black vanadium tetroxide or other compounds as sometimes happens, then 50–100 parts by weight of hydrochloric acid should be added to redissolve them. After the reduction of the vanadium compounds in the solution is complete, 750 parts by weight of 6–10 mesh "Tabular Corundum" containing less than 0.01 part by weight of combined sodium were added and the mixture gently heated with stirring until dried. About two hours were required for this step. After cooling, the catalyst was screened over a 20 mesh screen and the fines discarded. The catalyst was then in condition to place in the converter and the vanadium compounds were reduced in the converter as described in Example II given hereinafter. After reduction, the composition of the catalyst mass was as follows:

|  | Parts by weight |
|---|---|
| Vanadium oxides | 85 |
| Combined sodium | 0.42 |
| "Tabular Corundum" | 750 |

EXAMPLE II

The contact mass described in Example I was placed in the tubes of a converter and first ignited by carefully heating to a temperature of 550° C., measured in the catalyst mass, for a period of 5–8 hours while a stream of air and benzene vapor consisting of 25–40 parts by weight of air to one part by weight of benzene was passed through the contact mass. This ignition treatment stabilizes the contact mass as an active catalyst for the partial oxidation of benzene. After the ignition period, the catalyst mass was used to effect the partial oxidation of benzene with air using a ratio of 30–40 parts by weight of air to one part of benzene in the gas stream, catalyst temperatures of 580° C. and 610° C., respectively, at contact times of approximately 0.10 and 0.07 second, respectively. The following yields of maleic anhydride were obtained per 100 parts of benzene oxidized under the conditions indicated, as determined by the acidity of the aqueous solutions secured by absorbing the water-soluble products in the reacted gas stream:

Table 1

| Catalyst temp., °C. | Contact time | Duration | Yield |
|---|---|---|---|
| | Seconds | Hours | Pounds |
| 580 | 0.103 | 8 | 52.4 |
| 580 | 0.101 | 8 | 59.8 |
| 580 | 0.101 | 8 | 55.3 |
| 610 | 0.071 | 8 | 59.4 |
| 580 | 0.102 | 8 | 60.8 |
| 580 | 0.101 | 8 | 62.0 |

Example III

A contact mass was prepared using the method described in detail in Example I, using, however, a Pyrex glass container without the addition of a promoter, using 100 parts by weight of pure hydrated vanadium pentoxide, 750 parts by weight of pure concentrated hydrochloric acid and 800 parts by weight of 6–10 mesh "Tabular Corundum" containing approximately 0.3 part by weight of combined sodium. The composition of the resulting contact mass was, after ignition, approximately as follows:

Parts by weight
Vanadium oxides_____ 85
"Tabular Corundum" containing 0.3 part by weight of combined sodium_____ 800

The production of maleic anhydride per 100 pounds of benzene oxidized under the indicated conditions are given in Table 2 which follows:

Table 2

| Catalyst temp., °C. | Contact time | Duration | Yield |
|---|---|---|---|
| | Seconds | Hours | Pounds |
| 550 | 0.14 | 8 | 63.8 |
| 580 | 0.093 | 8 | 65.9 |
| 610 | 0.081 | 8 | 56.5 |
| 610 | 0.065 | 8 | 50.0 |

Example IV

As described in Example I, a contact mass was prepared without the addition of a promoter in a Pyrex glass container using 100 parts by weight of pure hydrated vanadium pentoxide, 750 parts by weight of pure hydrochloric acid and 750 parts by weight of 6–10 mesh "Tabular Corundum" containing approximately 0.01 part by weight of combined sodium. The composition of the resulting contact mass was, upon ignition, approximately as follows:

Parts by weight
Vanadium oxides_____ 85
"Tabular Corundum" containing approximately 0.01 part by weight of combined sodium _____ 750

The productions of maleic anhydride per 100 pounds of benzene using this contact mass under the conditions indicated is given in Table 3:

Table 3

| Catalyst temp., °C. | Contact temp. | Duration | Yield |
|---|---|---|---|
| | Seconds | Hours | Pounds |
| 580 | 0.102 | 6 | 56.9 |
| 580 | 0.094 | 6 | 58.1 |
| 610 | 0.073 | 6 | 46.3 |

Example V

A contact mass was prepared following the method described in Example I from 100 parts by weight of pure hydrated vanadium pentoxide, 5.5 parts by weight of calcium sulfate $(CaSO_4.2H_2O)$ 750 parts by weight of pure concentrated hydrochloric acid and 750 parts by weight of 6–10 mesh "Tabular Corundum" containing 0.3 part by weight of combined sodium. After ignition the contact mass had the following approximate composition:

Parts by weight
Vanadium oxides_____ 85
Combined calcium_____ 1.3
"Tabular Corundum" containing 0.3 part by weight of combined sodium_____ 750

Using this contact mass the productions of maleic anhydride given in Table 4 were obtained under the indicated conditions:

Table 4

| Catalyst temp., °C. | Contact time | Duration | Yield |
|---|---|---|---|
| | Seconds | Hours | Pounds |
| 550 | 0.14 | 8 | 69.3 |
| 580 | 0.11 | 8 | 63.0 |
| 610 | 0.081 | 8 | 58.1 |
| 610 | 0.068 | 8 | 59.4 |
| 610 | 0.084 | 8 | 55.9 |
| 610 | 0.072 | 8 | 57.6 |
| 610 | 0.066 | 8 | 50.4 |
| 550 | 0.14 | 8 | 56.5 |

Example VI

A contact mass was prepared in a fused silica container by the method of Example I, using 100 parts by weight of pure hydrated vanadium pentoxide, 2.1 parts by weight of anhydrous sodium sulfate, 600 parts by weight of pure concentrated hydrochloric acid and 750 parts by weight of 6–10 mesh "Tabular Corundum" containing approximately 0.01 part by weight of combined sodium. Upon ignition, this contact mass had the following composition:

Parts by weight
Pure vanadium oxides_____ 85
Combined sodium_____ 0.64
"Tabular Corundum" containing approximately 0.1 part by weight of combined sodium _____ 750

Using this contact mass the production of maleic anhydride per 100 lbs. benzene given in Table 5 under the indicated conditions were obtained:

Table 5

| Catalyst temp., °C. | Contact time | Duration | Yield |
|---|---|---|---|
| | Seconds | Hours | Pounds |
| 606 | 0.075 | 7 | 49.0 |
| 605 | 0.077 | 7 | 49.3 |
| 613 | 0.075 | 7 | 50.9 |
| 606 | 0.086 | 7 | 52.9 |
| 605 | 0.087 | 7 | 50.6 |
| 593 | 0.10 | 7 | 50.9 |
| 596 | 0.10 | 7 | 54.5 |
| 600 | 0.11 | 7 | 54.1 |
| 600 | 0.10 | 7 | 48.2 |
| 589 | 0.12 | 7 | 56.8 |
| 591 | 0.12 | 7 | 51.2 |

Example VII

A contact mass was prepared in a Pyrex glass container by the method described in Example I using 100 parts by weight of pure hydrated vanadium pentoxide, 2.3 parts by weight of lithium sulfate ($Li_2SO_4.H_2O$), 830 parts by weight of pure concentrated hydrochloric acid, and 750 parts by weight of 6–10 mesh "Tabular Corundum" containing approximately 2 parts by weight of combined sodium. Upon ignition, the composition of the contact mass was approximately as follows:

|  | Parts by weight |
|---|---|
| Vanadium oxides | 850 |
| Combined lithium | 0.25 |
| "Tabular Corundum" containing approximately 2 parts by weight of combined sodium | 750 |

Using this contact mass, the production of maleic anhydride per 100 lbs. of benzene are given in Table 6 under the indicated conditions were obtained:

Table 6

| Catalyst temp., °C. | Contact Time | Duration | Yield |
|---|---|---|---|
|  | Seconds | Hours | Pounds |
| 550 | 0.15 | 8 | 61.5 |
| 580 | 0.20 | 8 | 43.9 |
| 610 | 0.099 | 8 | 61.6 |
| 610 | 0.088 | 6 | 60.0 |
| 610 | 0.088 | 8 | 57.7 |
| 610 | 0.090 | 8 | 47.3 |
| 610 | 0.091 | 8 | 54.7 |
| 610 | 0.080 | 8 | 55.9 |
| 610 | 0.080 | 8 | 56.9 |
| 610 | 0.078 | 8 | 56.3 |
| 610 | 0.072 | 8 | 56.3 |
| 610 | 0.071 | 8 | 54.4 |
| 610 | 0.071 | 8 | 55.3 |
| 610 | 0.072 | 8 | 57.7 |
| 610 | 0.071 | 8 | 58.7 |
| 610 | 0.072 | 8 | 58.1 |
| 610 | 0.072 | 8 | 56.8 |
| 610 | 0.071 | 8 | 57.2 |
| 610 | 0.073 | 8 | 55.1 |
| 610 | 0.071 | 8 | 54.9 |
| 610 | 0.073 | 8 | 54.1 |
| 610 | 0.072 | 8 | 59.2 |
| 610 | 0.072 | 8 | 60.0 |
| 610 | 0.071 | 8 | 55.0 |
| 610 | 0.072 | 8 | 56.8 |
| 610 | 0.073 | 8 | 57.0 |
| 610 | 0.090 | 8 | 56.2 |
| 610 | 0.056 | 8 | 58.2 |
| 610 | 0.066 | 8 | 55.0 |
| 610 | 0.065 | 8 | 54.7 |
| 610 | 0.072 | 8 | 51.9 |
| 610 | 0.073 | 8 | 52.6 |
| 610 | 0.058 | 8 | 58.0 |
| 610 | 0.085 | 8 | 55.7 |
| 610 | 0.085 | 8 | 56.8 |

In the above table it will be noted that the contact mass described was used for a period of 278 hours, at the end of which time no substantial deterioration in the yield of maleic anhydride had occurred. This example clearly illustrated one of the outstanding advantages of "Tabular Corundum" as a catalyst support.

*Example VIII*

This example represents an embodiment of the invention as applied to the production of phthalic anhydride by the vapor phase oxidation of naphthalene with an oxygen containing gas.

The catalyst mass was prepared in a silica dish using substantially the same technique as described in Example I in preparing the vanadium solution and coating it on the carrier, which last was a 6–10 mesh "Tabular Corundum" containing less than 0.005 per cent by weight of sodium.

The proportions of materials employed were 211 parts of hydrated vanadium oxide (equivalent in the material used to 180 parts of actual $V_2O_5$), 1000 parts of CP concentrated hydrochloric acid, and 1680 parts of the "Tabular Corundum." During the preparation, 5.4 parts of CP potassium sulfate were added to act as a promoter. The dried catalyst was ignited in the convertor at a temperature of 500° C. with a stream of air passing over it for about 8 hours. It was then used to oxidize naphthalene, using a vapor mixture of air and naphthalene of a ratio of approximately 30 to 1 by weight, with temperatures (measured in the catalyst) and contact times as hereinafter stated. The yields of phthalic anhydride stated represent the parts by weight phthalic anhydride condensed and recovered per 100 parts by weight of naphthalene vaporized.

For comparison, runs were further made on another catalyst which was a duplicate in every way except that "Alundum" was used as the carrier instead of "Tabular Corundum."

The results were:

| Catalyst temp., °C. | Contact time | "Tabular Corundum" yield | "Alundum" yield |
|---|---|---|---|
|  | Seconds |  |  |
| 520 | 0.15 | 91 | 82 |
| 580 | 0.09 | 93 | 86.5 |

The very considerable improvements may be ascribed to the presence of sodium in the "Alundum" which lowers the yield as compared with the results obtained with the "Tabular Corundum." To verify this point, a third catalyst was prepared on "Tabular Corundum," the only other variable being the addition of 0.74 part of CP sodium sulfate as well as the 5.4 parts of potassium sulfate during the preparation of the catalyst. This catalyst after ignition showed a yield of 85 parts by weight of phthalic anhydride per 100 parts of naphthalene vaporized at 520° C. catalyst temperature and a contact time of 0.15 second and 89 parts at a catalyst temperature of 580° C. and a contact time of 0.09 second. As in the previous runs, the ratio of air to naphthalene was held at 30 to 1 by weight. The advantages of yield and control by the use of the "Tabular Corundum" with a low percentage of contained sodium are quite striking and indicate the great utility of the material in preparing catalysts for phthalic anhydride manufacture.

It will be understood that the details and examples given hereinbefore are by way of illustration and not by way of limitation of the invention as broadly described and claimed.

What I claim and desire to protect by Letters Patent is:

1. A contact mass adapted for the catalytic partial oxidation of organic compounds including a rigid crystalline alumina refractory, consisting essentially of interlocked corundum crystals in tabular form substantially free of inter-crystalline glass, impregnated and coated with an oxidation catalyst.

2. A contact mass adapted for the catalytic partial oxidation of organic compounds including a rigid crystalline alumina refractory, consisting essentially of interlocked corundum crystals in tabular form substantially free of inter-crystalline glass, impregnated and coated with a metal oxide oxidation catalyst.

3. A contact mass adapted for the catalytic partial oxidation of organic compounds including a rigid crystalline alumina refractory, consisting essentially of interlocked corundum crystals in tabular form substantially free of inter-crystalline glass, impregnated and coated with vanadium oxide in catalytic form.

4. A contact mass adapted for the catalytic partial oxidation of organic compounds including a rigid crystalline alumina refractory, consisting essentially of interlocked corundum crystals in tabular form substantially free of crystalline glass, impregnated and coated with molybdenum oxide in catalytic form.

5. A contact mass adapted for the catalytic production of maleic acid by the partial oxidation of a suitable organic compound, comprising a rigid, crystalline alumina refractory consisting essentially of interlocked corundum crystals in tabular form substantially free of inter-crystalline glass and containing combined sodium in amount not in excess of about 0.35% by weight impregnated and coated with vanadium oxide in catalytic form.

6. A contact mass adapted for the catalytic production of maleic acid by the partial oxidation of a suitable organic compound, comprising a rigid, crystalline alumina refractory consisting essentially of interlocked corundum crystals in tabular form substantially free of inter-crystalline glass, impregnated and coated with vanadium oxide in catalytic form containing a compound of an element from the group consisting of sodium, potassium, lithium, magnesium, calcium, and beryllium, the said compound being present in an amount which promotes the catalytic activity of the vanadium oxide.

7. A contact mass adapted for the catalytic production of maleic acid by the partial oxidation of a suitable organic compound, comprising a rigid, crystalline alumina refractory consisting essentially of interlocked corundum crystals in tabular form substantially free of inter-crystalline glass, impregnated and coated with vanadium oxide in catalytic form and a sodium compound, the total sodium content of the contact mass calculated on the basis of vanadium oxide being not in excess of 2% by weight.

JOHN M. WEISS.